(12) United States Patent
Hayakawa et al.

(10) Patent No.: US 8,189,289 B2
(45) Date of Patent: May 29, 2012

(54) ELECTRICALLY CONDUCTIVE SPACER AND DISK DRIVE INCLUDING THE ELECTRICALLY CONDUCTIVE SPACER

(75) Inventors: Takako Hayakawa, Kanagawa (JP); Kouki Uefune, Kanagawa (JP); Akihiko Aoyagi, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/558,343

(22) Filed: Sep. 11, 2009

(65) Prior Publication Data
US 2011/0128651 A1 Jun. 2, 2011

(30) Foreign Application Priority Data
Sep. 11, 2008 (JP) .................. 2008-234063

(51) Int. Cl.
*G11B 17/038* (2006.01)
*G11B 33/14* (2006.01)
*G11B 17/028* (2006.01)
(52) U.S. Cl. .................. 360/98.08; 360/99.12
(58) Field of Classification Search ............... 360/98.08, 360/99.12
See application file for complete search history.

(56) References Cited

U.S. PATENT DOCUMENTS

| | | | | |
|---|---|---|---|---|
| 5,422,768 A | * | 6/1995 | Roehling et al. | 360/98.08 |
| 5,659,443 A | * | 8/1997 | Berberich | 360/98.06 |
| 6,040,957 A | * | 3/2000 | Konings | 360/98.08 |
| 6,055,123 A | * | 4/2000 | Kazmierczak et al. | 360/98.08 |
| 6,172,844 B1 | * | 1/2001 | Luo et al. | 360/98.08 |
| 6,222,700 B1 | * | 4/2001 | Martin et al. | 360/98.08 |
| 6,462,902 B1 | * | 10/2002 | Luo et al. | 360/99.12 |
| 6,603,634 B1 | * | 8/2003 | Wood et al. | 360/98.08 |
| 6,624,968 B1 | * | 9/2003 | Chessman et al. | 360/99.12 |
| 6,690,541 B2 | * | 2/2004 | Kazmierczak | 360/98.08 |
| 6,888,698 B1 | | 5/2005 | Berding et al. | |
| 2001/0022703 A1 | | 9/2001 | McCutcheon et al. | |
| 2001/0036038 A1 | * | 11/2001 | Kazmierczak | 360/98.08 |
| 2006/0044676 A1 | | 3/2006 | Ueda et al. | |

FOREIGN PATENT DOCUMENTS

| | | | | |
|---|---|---|---|---|
| JP | 62175980 A | * | 8/1987 |
| JP | 09027177 A | * | 1/1997 |
| JP | 09044969 A | * | 2/1997 |
| JP | 2001-319444 | | 11/2001 |
| JP | 2006185560 A | * | 7/2006 |
| WO | WO 9326006 A1 | * | 12/1993 |

* cited by examiner

*Primary Examiner* — Will J Klimowicz (57) ABSTRACT

A disk drive. The disk drive includes a motor, a hub coupled to a spindle shaft of the motor, at least two disks each having a center hole and being coupled to the hub, and a spacer having a center hole. The spacer is disposed around the hub such that the hub is disposed within the center hole of the spacer; and, the spacer is sandwiched between and in contact with the two disks to define spacing between the disks. The spacer includes at least two conductive rings and the conductive rings are secured between the two disks. The spacer also includes a damping sheet configured to absorb vibration between the conductive rings, and a conductive ring-shaped spring having a spring characteristic in a radial direction of the disks to make a diameter variable. Moreover, the conductive ring-shaped spring is in contact with both of the two conductive rings.

20 Claims, 7 Drawing Sheets

ELECTRICALLY CONDUCTIVE SPACER AND DISK DRIVE INCLUDING THE ELECTRICALLY CONDUCTIVE SPACER

CROSS-REFERENCE TO RELATED APPLICATION

This application claims priority from the Japanese Patent Application No. 2008-234063, filed Sep. 11, 2008 the disclosure of which is incorporated herein in its entirety by reference.

TECHNICAL FIELD

Embodiments of the present invention relate to disk drives and spacers used to separate and secure disks in a disk drive.

BACKGROUND

Hard-disk drives (HDDs) have been widely used as data-storage devices that have proven to be indispensable for contemporary computer systems. Moreover, HDDs have found widespread application to moving image recording and reproducing apparatuses, car navigation systems, cellular phones, and similar devices, in addition to the computers, due to their outstanding information-storage characteristics.

As information-storage technology advances and the range of applications for the use of HDDs has increased, the demand for HDDs with larger capacity, higher recording density and higher speed access has grown. In order to meet this market demand, high track-density and high bit-density magnetic-recording disks have come into use in HDDs. Furthermore, HDDs that rotate magnetic-recording disks, and move actuators to access data, at high speeds have been developed to meet these demands. For HDDs with higher recording density and higher speed access, improvement in the accuracy of positioning head-sliders to access data is highly desirable.

However, at such high speeds, the accuracy of positioning head-sliders is affected by "flutter" of the magnetic-recording disk, a term of art for a form of vibration affecting the magnetic-recording disk. Flutter affects magnetic-recording disks, when rotated by a spindle motor, through vibration in the axial direction of the spindle upon which magnetic-recording disks are mounted. Flutter of magnetic-recording disks mainly depends on the accuracy of assembly of magnetic-recording disks within the HDD and airflow caused by the rotation of the magnetic-recording disks. Reducing the flutter of magnetic-recording disks is one way to improve the accuracy of positioning head-sliders. Thus, engineers and scientists engaged in the development of new HDD technology are interested in means for increasing the mechanical stability of magnetic-recording disks and suppressing vibration, for example, due to flutter, in HDDs.

SUMMARY

Embodiments of the present invention include a disk drive. The disk drive includes a motor, a hub coupled to a spindle shaft of the motor, at least two disks each having a center hole and being coupled to the hub, and a spacer having a center hole. The spacer is disposed around the hub such that the hub is disposed within the center hole of the spacer; and, the spacer is sandwiched between and in contact with the two disks to define spacing between the two disks. The spacer includes at least two conductive rings each having a center hole such that the two conductive rings are disposed around the hub such that the hub is disposed within the center hole of the two conductive rings, and the two conductive rings are secured between the two disks. Moreover, the spacer includes a damping sheet configured to absorb vibration between the two conductive rings, and a conductive ring-shaped spring having a spring characteristic in a radial direction of the disks to make a diameter variable. The conductive ring-shaped spring is in contact with both of the two conductive rings.

DESCRIPTION OF THE DRAWINGS

The accompanying drawings, which are incorporated in and form a part of this specification, illustrate embodiments of the invention and, together with the description, serve to explain the embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for an Electrically Conductive Spacer and a Disk Drive Including the Electrically Conductive Spacer In accordance with embodiments of the present invention, a typical HDD includes a plurality of magnetic-recording disks. The magnetic-recording disks are secured on a hub of a spindle motor at specific intervals. A spacer is configured to be interposed between magnetic-recording disks to form a determined spacing between the magnetic-recording disks. Typically, a spacer is an O-ring with an outside diameter (OD) smaller than the magnetic-recording disks. The inside diameter (ID) is slightly larger than the OD of the hub. The spacer is slid onto the hub, as are the magnetic-recording disks, and is sandwiched between two magnetic-recording disks in proximity to the IDs of the magnetic-recording disks. Since a spacer is stacked with magnetic-recording disks, a spacer provides a damping function that is capable of reducing the flutter of the magnetic-recording disks. For example, a spacer may be formed by sandwiching an adhesive damping sheet between two O-rings. The spacer placed between magnetic-recording disks is then capable of reducing the flutter and unbalanced vibration of the magnetic-recording disks.

In accordance with embodiments of the present invention, an important characteristic of a spacer is electrical conductivity. Removing electrical charges from the magnetic-recording disks prevents electrostatic discharge (ESD) between the head-slider and a magnetic-recording disk that may damage a magnetic-recording head of the HDD. Electrical charges can be removed to prevent ESD by grounding magnetic-recording disks through a hub. The ID surface of the center hole of a magnetic-recording disk is separated from the OD surface of the hub to precisely position the magnetic-recording disk and to prevent dust-particle generation. Thus, in order to ground a magnetic-recording disk secured at a middle position in the stack of magnetic-recording disks on the hub, a spacer disposed between magnetic-recording disks is an electrical conductor and the middle magnetic-recording disk is grounded through another disk. However, if a spacer sandwiches a damping sheet in the middle of the disk stack, some measures are taken to electrically connect the upper and lower disks by the spacer. Generally, damping sheets are insulating and two spacers disposed on opposite sides of a damping sheet are electrically insulated from one another. Although conductive damping sheets are known in the art, the range of choices of materials is limited, which makes the choice of a damping sheet with suitable damping performance for a disk drive difficult. Furthermore, metal particles embedded in a damping sheet to provide electrical conductivity may become dislodged from the damping sheet and spread in a disk enclosure (DE) adversely affecting operations of the HDD.

Figure 9:
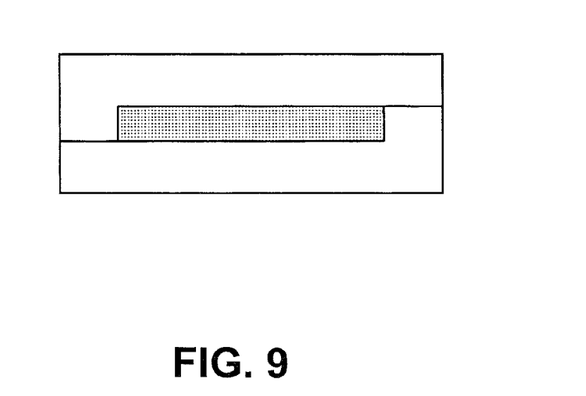
FIG. 9 is a cross-sectional elevation view that illustrates the change of an example conventional spacer, known in the art.

With reference now to FIG. 9, a cross sectional view of a conventional spacer, known in the art, is depicted. As shown in FIG. 9, in contrast with embodiments of the present invention, a conventional spacer is depicted which has a resin damping sheet sandwiched between upper metal and lower metal rings which are in contact with each other. The conventional spacer has conductive O-rings with L-shaped cross sections and a resin layer is provided between the two O-rings. The resin layer improves the damping performance. The two O-rings have lands at the OD and ID surfaces and the top of each land contact the opposite O-ring. The conventional spacer has a damping function to reduce the flutter of magnetic-recording disks and adequate electrical conductivity to ground the magnetic-recording disks. However, high manufacturing accuracy is required for spacers to secure magnetic-recording disks at precise positions. Magnetic-recording disks must be secured in parallel to precisely position the magnetic-recording disks. The upper and lower surfaces of the conventional spacer must be formed in parallel and flat. The conventional spacer has an integrated structure with damping material so that mechanically working the upper and lower surfaces precisely becomes challenging. Furthermore, surfaces of upper and lower spacers may be directly in contact. In such structures it is desirable to have not only high flatness at each surface but also high parallelism between surfaces in contact, which makes manufacturing challenging.

For embodiments of the present invention, the practical usage environment of HDDs is also a concern for spacer design. HDDs are used in various environments; and particularly, HDDs mounted in mobile devices are subjected to significant temperature changes. The HDD includes components that expand and contract with temperature variation. Thus, in accordance with embodiments of the present invention, spacers used between magnetic-recording disks are designed in consideration of thermal expansion and contraction and in consideration of any reduction in damping performance due to such thermal expansion and contraction. Therefore, in accordance with embodiments of the present invention, a new technique is provided to manufacture efficiently spacers that are electrical conductors, possess adequate damping performance, and suppress any reduction in damping performance associated with thermal expansion and contraction attending HDD usage.

In accordance with embodiments of the present invention, a disk drive includes a motor, a hub coupled to a spindle shaft of the motor, at least two disks each having a center hole and being coupled to the hub which is provided through the hole, and a spacer having a center hole with the hub being therethrough and being sandwiched between and in contact with the two disks to define a spacing between the two disks. Thus, the spacer is disposed around the hub such that the hub is disposed within the center hole of the spacer. The spacer includes at least two conductive rings each having a center hole with the hub being therethrough and being secured between the two disks, a damping sheet configured to absorb vibration between the two conductive rings, and a conductive ring-shaped spring having a spring characteristic in a radial direction of the disks to make a diameter variable and being in contact with both of the two conductive rings. Thus, the two conductive rings are disposed around the hub such that the hub is disposed within the center hole of the two conductive rings. The spacer provides electrical conductivity between disks and absorbs vibration effectively while maintaining a specific spacing between the disks.

In an embodiment of the present invention, the ring-shaped spring is cut at one location and is straight in the circumferential direction. Thus, the cut facilitates assembly of the ring-shaped spring on the hub of the HDD and allows the ring-shaped spring to change diameter smoothly. In an embodiment of the present invention, the ends of the ring-shaped spring are configured to be separated when the ring-shaped spring is mounted. Separated ends of the ring-shaped spring allow the ring-shaped spring to change diameter according to the expansion and contraction of components.

In another embodiment of the present invention, the ring-shaped spring is in contact with ID surfaces of the upper ring and the lower ring while pressing the ID surfaces of the upper ring and the lower ring. This configuration of the ring-shaped spring prevents the ring-shaped spring from coming off with rotation of the disk.

In one embodiment of the present invention, the two conductive rings include an upper ring and a lower ring such that the side surface of the upper ring includes a tapered surface on the lower side, the side surface of the lower ring includes a tapered surface on the upper side, and the ring-shaped spring is in contact with both of the tapered surface of the upper ring and the tapered surface of the lower ring. In another embodiment of the present invention, the cross-section of the ring-shaped spring is circular. In another embodiment of the present invention, taper angles of the tapered surface of the upper ring and the tapered surface of the lower ring are equal. Thus, the diameter of the ring-shaped spring changes smoothly and the electrical conductivity of the spacer is maintained. In one embodiment of the present invention, the tapered surface of the upper ring and the tapered surface of the lower ring each satisfy the following relationship with the ring-shaped spring, $\theta<\arctan(\mu)$, where $\theta$ is a taper angle and $\mu$ is a friction coefficient between the ring-shaped spring and the tapered surface. Satisfaction of the relationship for the ring-shaped spring allows the ring-shaped spring to move against the friction force to securely contact the side surfaces of the upper and lower rings.

In another embodiment of the present invention, the disk drive further includes a clamp for securing a plurality of disks including the at least two disks with a supporter of the hub to sandwich the disks, and a second spacer having the same structure as the spacer between the clamp and the disk and/or between the supporter and the disk. This configuration provides electrical conductivity and vibration absorption in the spacer while adjusting the spacing between the magnetic-recording disk and the supporter or the clamp.

In accordance with other embodiments of the present invention, a disk drive includes a motor, a hub coupled to a spindle shaft of the motor, a disk having a center hole and being coupled to the hub which is provided through the hole, a clamp for securing the disk to the hub and, a spacer having a center hole with the hub being therethrough and being sandwiched between and in contact with the disk and the clamp to define a spacing between the disk and the clamp. Thus, the spacer is disposed around the hub such that the hub is disposed within the center hole of the spacer. The spacer includes a conductive ring having a center hole with the hub being therethrough and being secured between the clamp and the disk, a damping sheet configured to absorb vibration between the conductive ring and the disk, and a conductive ring-shaped spring having a spring characteristic in the radial direction of the disk to make the diameter variable and being in contact with the conductive ring and the disk sandwiching the damping sheet. Thus, the conductive ring is disposed around the hub such that the hub is disposed within the center hole of the conductive ring. The spacer provides electrical conductivity between disks and absorbs vibration effectively while maintaining a specific spacing between the disks.

In accordance with further embodiments of the present invention, the spacer is configured to be interposed between disks of a disk drive to define a spacing between the disks. The spacer includes an upper ring that is an electrical conductor having a center hole, a lower ring that is an electrical conductor having a center hole, a damping sheet provided between the upper ring and the lower ring and configured to absorb vibration of the upper ring and the lower ring, and a ring-shaped conductive spring having a spring characteristic in a radial direction of the upper ring and the lower ring to make a diameter variable and being in contact with both side surfaces of the upper ring and the lower ring while pressing the side surfaces of the upper ring and the lower ring. The spacer provides electrical conductivity between disks and absorbs vibration effectively while maintaining a specific spacing between the disks. Embodiments of the present invention provide a spacer with superior damping performance, electrical conductivity and parallelism which can be efficiently manufactured.

In accordance with embodiments of the present invention, a spacer is interposed between magnetic-recording disks of a HDD. In an embodiment of the present invention, the spacer possesses both damping performance and electrical conductivity. Thus, the spacer is capable of suppressing flutter of magnetic-recording disks and removing electrical charges from the magnetic-recording disks. In an embodiment of the present invention, the spacer includes a damping sheet that provides damping performance. Additionally, the spacer has a ring-shaped spring in contact with both parts sandwiching the damping sheet. Since the ring-shaped spring deforms easily and holds the spacer by a spring force, the mounting the spacer to the hub in assembly of the HDD facilitates manufacturing.

In accordance with embodiments of the present invention, the ring-shaped spring is electrically conductive and electrically connects the parts sandwiching the damping sheet. The ring-shaped spring provides the electrical continuity to the spacer that includes the insulating damping sheet. The ring-shaped spring has a spring characteristic in a radial direction and a variable radius. Thus, the ring-shaped spring may deform with the deformation of the parts sandwiching the damping sheet and variations in the thickness of the damping sheet to provide electrical continuity to the spacer without interfering with damping performance.

Figure 1:
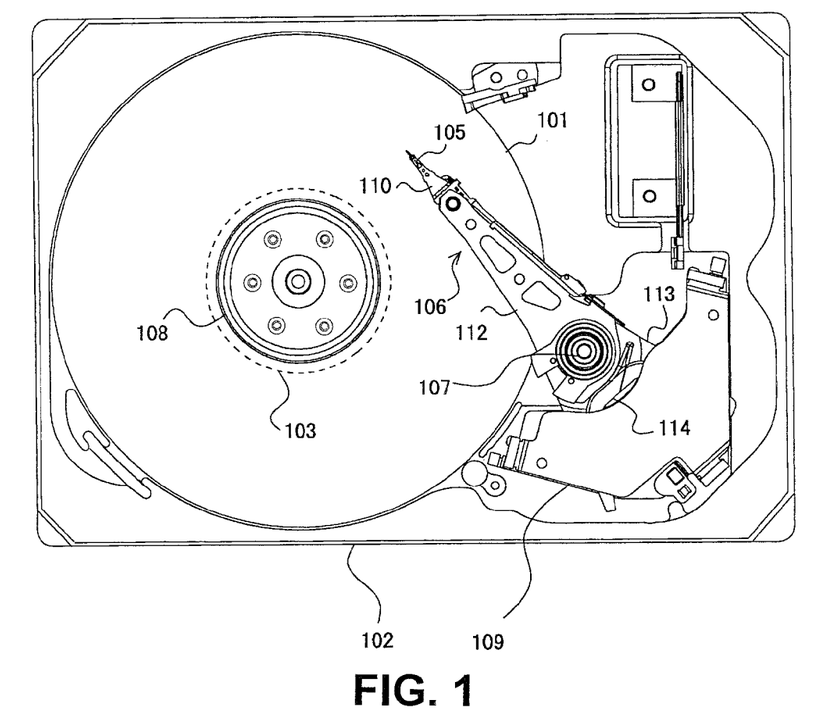
FIG. 1 a plan view that schematically illustrates the configuration of an example hard-disk drive (HDD), in accordance with an embodiment of the present invention.

With reference now to FIG. 1, in accordance with an embodiment of the present invention, before describing in detail the structure of the spacer, the configuration of the HDD 1 in which spacers are mounted is next described. Descriptions given herein for a HDD 1, as an example of a disk drive, are by way of example without limitation thereto. A HDD 1 includes a plurality of magnetic-recording disks 101, of which only the top magnetic-recording disk 101 is illustrated in FIG. 1, in a base 102 of a disk enclosure (DE) and head-sliders 105 corresponding to recording surfaces of magnetic-recording disks 101, respectively. The magnetic-recording disk 101 includes a recording surface on each surface. The head-sliders 105 fly over magnetic-recording disks at a distance, referred to by the term of art, "fly-height," between the head-slider 105 and the recording surface of the magnetic-recording disk 101. The surface of the head-slider 105 facing the magnetic-recording disk is called an air bearing surface (ABS). The magnetic-recording disks 101 are coupled to a spindle motor (SPM) 103 with a clamp 108 in the base 102. The SPM 103 rotates in accordance with control data from a control circuit (not shown) to rotate the magnetic-recording disks 101 coupled thereto at a specific angular velocity. As used herein, the axial direction of the spindle may also be referred to as the upper-lower direction; and, the lower side of the magnetic-recording disk, which is the side disposed facing the direction of the base 102, may also be referred to herein as the base side. A top cover (not shown) closes an opening of the base 102 of the DE; and, the upper side of the magnetic-recording disk, which is the side disposed facing the direction of the top cover, or opposite the base 102 of the DE, may also be referred to herein as the top cover side. The manner in which the magnetic-recording disks 101 are secured, or coupled to the hub, is subsequently described.

With further reference to FIG. 1, in accordance with an embodiment of the present invention, an actuator 106, a mechanism for moving the head-sliders 105, is mounted on a pivot shaft 107 and driven by a voice coil motor (VCM) 109 as a driving mechanism. The actuator 106 includes a suspension 110, an arm 111, a coil support 112 and a flat coil 113 connected in this order from the distal end at which the head-slider 105 is affixed. The VCM 109 rotates the actuator 106 about the pivot shaft 107 in the lateral direction according to control signals from a controller (not shown) by drive currents provided to the flat coil 113. The actuator 106 moves the head-sliders 15 along a nominally radial direction of the recording surface of the magnetic-recording disk 101 to access data recorded on the magnetic-recording disk 101 and also provides for moving the head-sliders 105 outside the outer periphery, or OD, of the magnetic-recording disks 101 to park the head-sliders on a ramp when the HDD 1 powers down. Thus, the head-sliders 15 may access, read data from, or write data to, desired data tracks of the magnetic-recording disk 101.

Figure 2:
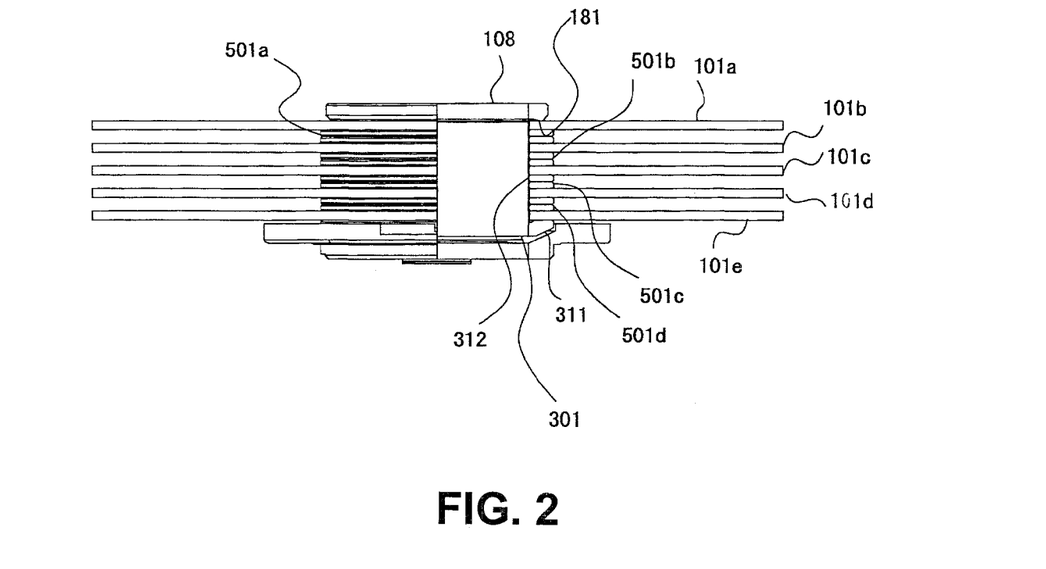
FIG. 2 is a combined side view and cross-sectional elevation view of the spindle of the HDD of FIG. 1 that illustrates magnetic-recording disks and example spacers secured to a hub of a spindle motor, in accordance with an embodiment of the present invention.

With reference now to FIG. 2, in accordance with an embodiment of the present invention, the SPM 103 and the plurality of magnetic-recording disks 101 coupled to the SPM 103 are shown. The left side of FIG. 2 is a side view, and the right side is a cross-sectional elevation view with the internal structure omitted. In the example in FIG. 2, five magnetic-recording disks 101*a* to 101*e* are stacked on the SPM 103 in a disk stack. The SPM 103 has a cylindrical hub 301 secured on the spindle axis (not shown) at the center. The magnetic-recording disks 101*a* to 101*e* are coupled to the hub 301. Specifically, the hub 301 includes a ring-shaped supporter 311 at the bottom for supporting the bottom magnetic-recording disk 101*e* and the other four magnetic-recording disks 101*a* to 101*d* are stacked on the supporter 311. A disk-shaped clamp 108 on the top magnetic-recording disk 101*a* is secured to the hub 301. The magnetic-recording disks 101*a* to 101*e* are sandwiched between the clamp 108 and the supporter 311. A ring-shaped protrusion 181 at the outside of the clamp 108 contacts an inner area of the upper surface of the magnetic-recording disk 101*a* and presses the magnetic-recording disks 101*a* to 101*e* onto the supporter 311.

With further reference to FIG. 2, in accordance with an embodiment of the present invention, the magnetic-recording disks 101*a* to 101*e* have holes at the centers and a cylindrical side surface 312 of the hub 301 is provided that engages the magnetic-recording disks 101*a* to 101*e* through the holes. The IDs of the magnetic-recording disks 101*a* to 101*e* are slightly greater than the OD of the cylindrical side surface 312 of the hub 301. The ID surfaces in the holes of the magnetic-recording disks 101*a* to 101*e* are separated from the side surface 312 of the hub 301; and, there are spacings between the ID surfaces in the holes of the magnetic-recording disks 101*a* to 101*e* and the side surface 312 of the hub 301. Spacers 501*a* to 501*d* are interposed in respective spacings between the magnetic-recording disks 101*a* to 101*e*. The spacers 501*a* to 501*d* each contact the respective magnetic-recording disks 101*a* to 101*e* sandwiching an individual magnetic-recording disk in the disk stack at upper and lower sides of the magnetic-recording disk.

With further reference to FIG. 2, in accordance with an embodiment of the present invention, the spacers 501*a* to 501*d* define spacings between the magnetic-recording disks. In an embodiment of the present invention, the spacers 501*a* to 501*d* are electrical conductors. Therefore, electrical charges on surfaces of the magnetic-recording disks 101*a* to 101*e* may flow to the hub 301 through the spacers 501*a* to 501*d* that are in physical and electrical contact with the magnetic-recording disks 101*a* to 101*e* and hub 301. As a result, electric charges are conducted away from the magnetic-recording disks 101*a* to 101*e*; and, ESD events that may damage the magnetic-recording heads are prevented from occurring. Furthermore, in an embodiment of the present invention, the spacers 501*a* to 501*d* perform a vibration damping function that suppresses the flutter of the magnetic-recording disks 101*a* to 101*e*. The spacers 501*a* to 501*d* have the identical structure. Therefore, hereinafter, the spacers 501*a* to 501*d* will be collectively referred to as spacer 501.

Figure 3:
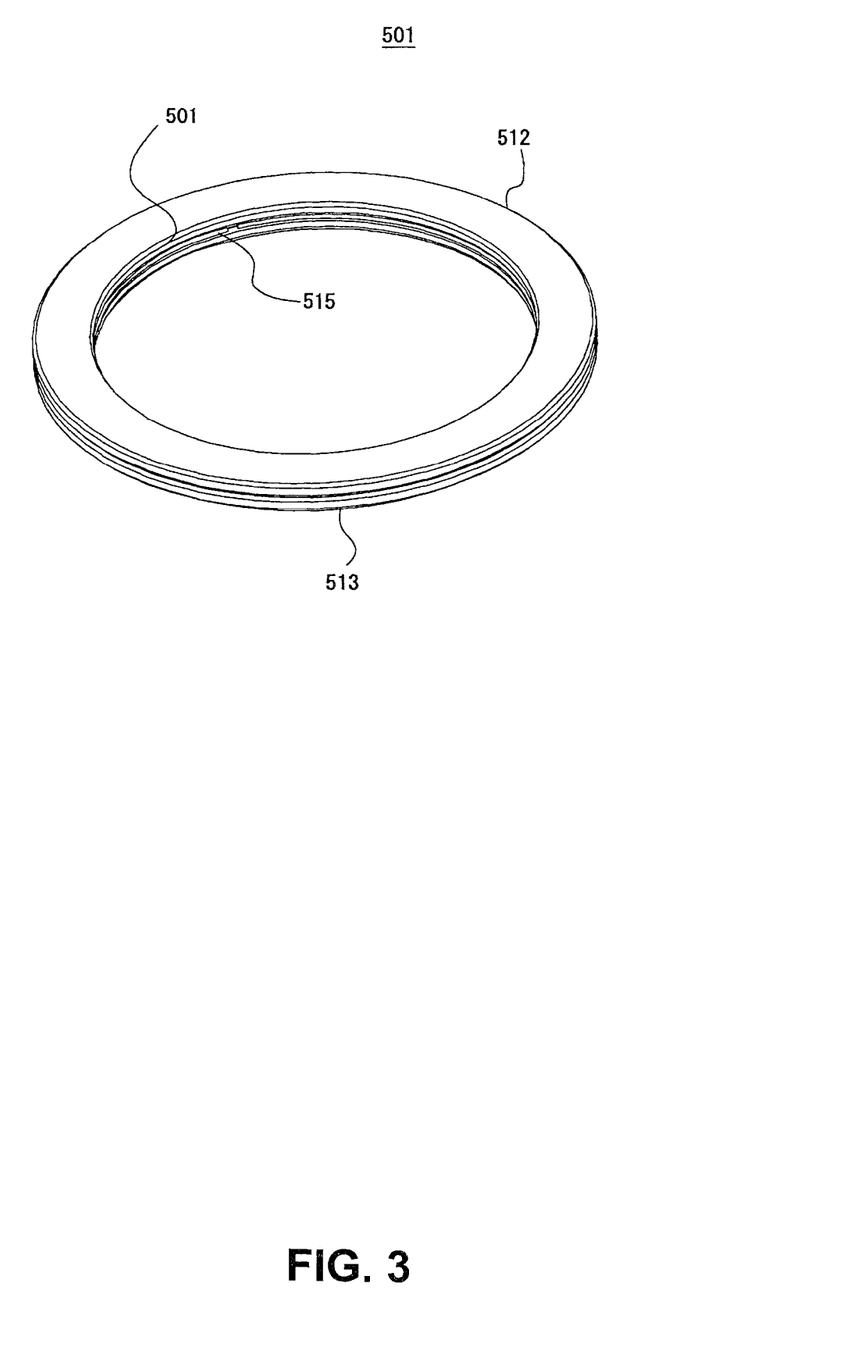
FIG. 3 is a perspective view that illustrates the structure of an example spacer, in accordance with an embodiment of the present invention.

With reference now to FIG. 3, in accordance with an embodiment of the present invention, the spacer 501 is shown as a ring-shaped part. More specifically, the spacer 501 is an O-ring-shaped part and has a hole at the center. With further reference to FIG. 2, in accordance with an embodiment of the present invention, the spacer 501 is fitted to the hub 301 and the cylindrical side surface 312 is provided through the hole of the spacer 501. The ID of the spacer 501 is a little larger than the OD of the cylindrical side surface 312. The ID surface of the spacer 501 is separated from the side surface 312 of the hub 301 and there is spacing between the ID surface of the spacer 501 and the side surface 312 of the hub 301.

With further reference to FIGS. 2 and 3, in accordance with an embodiment of the present invention, the ring-shaped protrusion 181 on the outside of the clamp 108, the center diameter of the spacer 501, and the center diameter of the supporter 311 are substantially aligned. This structure allows the clamp 108 and the hub 301 to rigidly hold the magnetic-recording disks 101*a* to 101*e* and the spacers 501*a* to 501*d*. The centers of the magnetic-recording disks 101*a* to 101*e*, the spacers 501*a* to 501*d* and the supporter 311 are substantially aligned with the center of the spindle axis. The OD surfaces of the clamp 108, the spacers 501*a* to 501*d* and the supporter 311 are located closer to the radial position of the ID of the magnetic-recording disk than the inner peripheries of the data areas of the magnetic-recording disks 101*a* to 101*e*.

Figure 4:
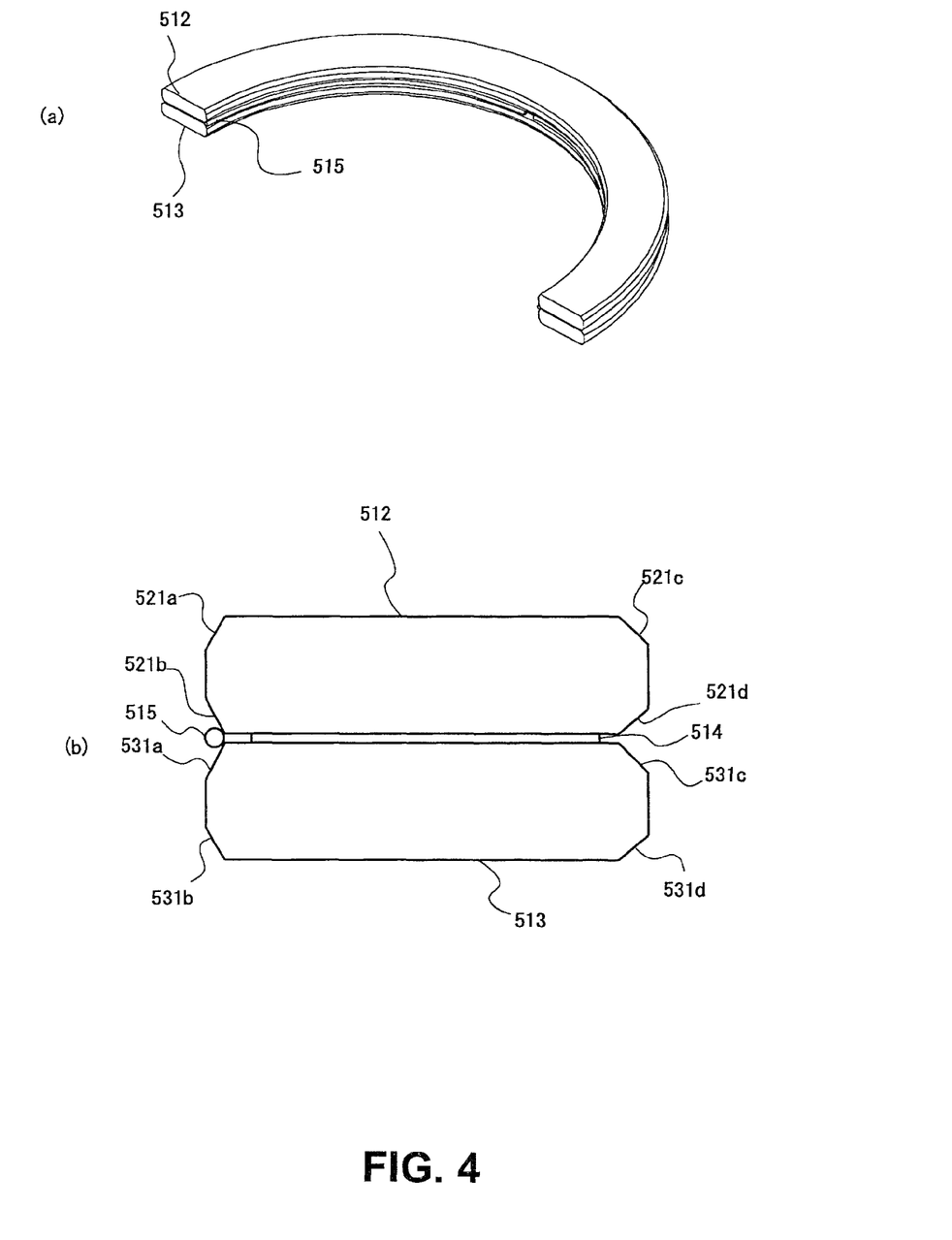
FIG. 4(a) is a cut-away perspective view that further illustrates the structure of the example spacer of FIG. 3, in accordance with an embodiment of the present invention.
FIG. 4(b) is a cross-sectional elevation view through the spacer of FIG. 4(a) that further illustrates the structure of the spacer of FIG. 4(a), in accordance with an embodiment of the present invention.

With reference now to FIG. 4(*a*), in accordance with an embodiment of the present invention, a cut-away perspective view illustrating the structure of a portion cut from the spacer 501 is shown. FIG. 4(*b*) is a cross-sectional elevation view depicting a cross section of the spacer 501. As illustrated in FIGS. 4(a) and 4(b), the spacer 501 includes four parts. Specifically, the spacer 501 includes an upper ring 512, a lower ring 513, a damping sheet 514 and a ring-shaped spring 515 cut at one location. The ring-shaped spring 515 is a substantially circle ring that includes a spring that is cut at a single location which provides a gap in the spring that may be closed. The ring-shaped spring 515 includes a spring selected from the group consisting of a circular spring, which has a constant diameter, and an elliptical spring. The ring-shaped spring 515 includes a ring selected from the group consisting of a ring which is straight in the circumferential direction and a ring which is wave-shaped in the circumferential direction. In one embodiment of the present invention, the upper ring 512 and the lower ring 513 are made of the same material and have the same shape, which simplifies the structure of the spacer 501 and balances the upper and lower parts of the spacer 501.

With further reference to FIGS. 3 and 4, in accordance with an embodiment of the present invention, the upper ring 512 and the lower ring 513 are O-ring shaped parts. The surfaces of the upper ring 512 and the lower ring 513 are made of electrically conductive material. Typically, the upper ring 512 and the lower ring 513 are made of an aluminum alloy or the upper ring 512 and the lower ring 513 include an aluminum-alloy body, or alternatively, a ceramic body, with a metallic plated surface, for example, nickel plating. The material that is selected for the upper and lower rings 512 and 513 depends on the thermal expansion ratio of the magnetic-recording disks 101, which depends on design of the HDD 1. The damping sheet 514 is interposed between the upper ring 512 and the lower ring 513. Therefore, the upper ring 512 and the lower ring 513 are spaced. The damping sheet 514 is made of viscoelastic material and is generally electrically insulating. The damping sheet 514 bonds the upper ring 512 and the lower ring 513. The damping sheet 514 absorbs the vibrations of the upper ring 512 and the lower ring 513 to reduce the flutter of the magnetic-recording disks 101a to 101e. The ID of the damping sheet 514 is greater than the IDs of the upper ring 512 and the lower ring 513 and the OD of the damping sheet 514 is smaller than the ODs of the upper ring 512 and the lower ring 513. Thus, the damping sheet 514 is completely contained in the space between the upper ring 512 and the lower ring 513 and damping sheet 514 does not extend beyond the outer peripheries of the upper ring 512 and the lower ring 513 when viewed in the upper-lower direction.

With further reference to FIGS. 3 and 4, in accordance with an embodiment of the present invention, the ring-shaped spring 515, the diameter of which is variable, is placed on the ID surfaces of the upper ring 512 and the lower ring 513. The ring-shaped spring 515 is in contact with the both ID surfaces of the upper ring 512 and the lower ring 513. The surface of the ring-shaped spring 515 is electrically conductive and electrically connects the upper ring 512 and the lower ring 513. Thus, even if the viscoelastic material of the damping sheet 514 is electrically insulating, electrical continuity is provided between the upper ring 512 and the lower ring 513. In an embodiment of the present invention, the ring-shaped spring 515 is made of metal, for example, the ring-shaped spring 515 may be a nickel plated stainless steel part. A manufacturing method for the spacer 501 bonds the upper ring 512 and the lower ring 513 with the damping sheet 514, and then fits the ring-shaped spring 515 to the ID surfaces of the upper ring 512 and the lower ring 513.

Figure 5:
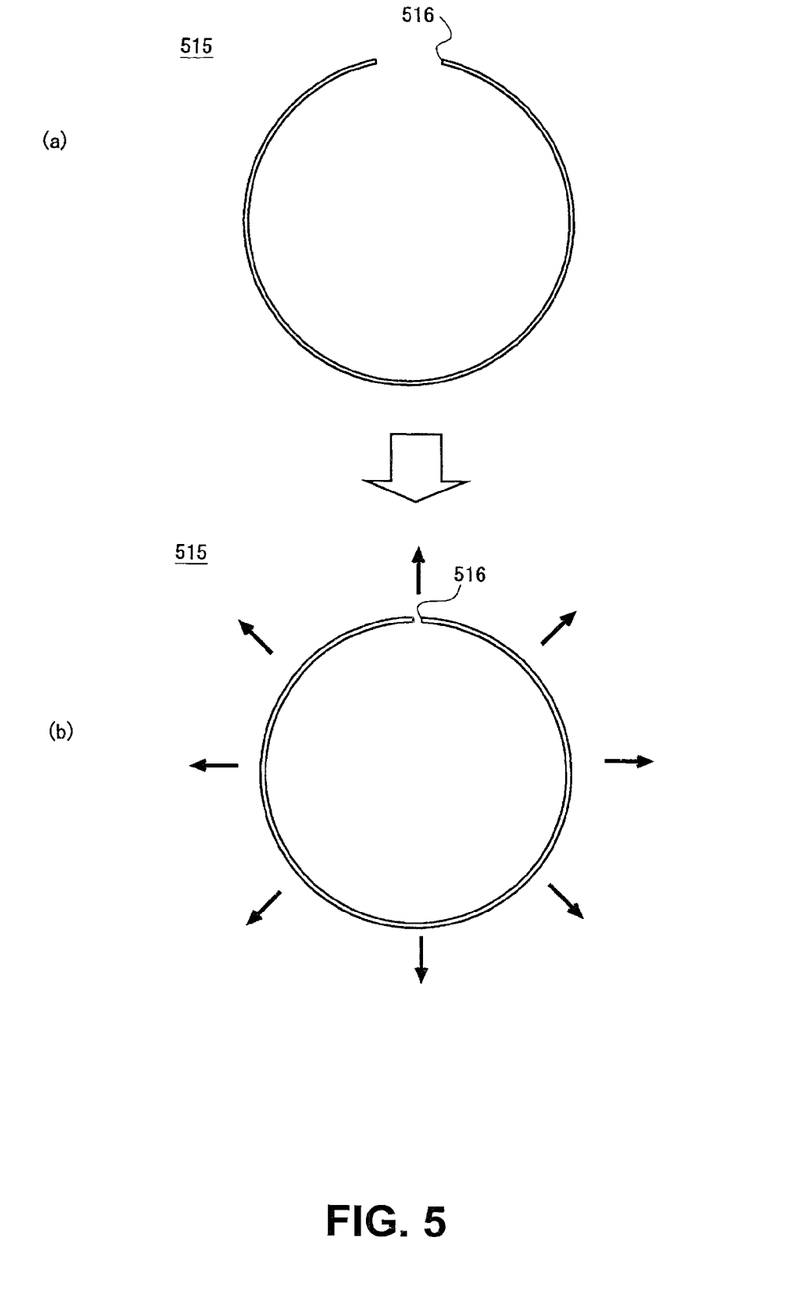
FIG. 5(a) is a plan view of an example ring-shaped spring that is a portion of the spacer of FIGS. 4(a) and 4(b), in accordance with an embodiment of the present invention.
FIG. 5(b) is a plan view of the ring-shaped spring of FIG. 5(a) that illustrates a change of shape of the ring-shaped spring of FIG. 5(a), in accordance with an embodiment of the present invention.

With reference now to FIGS. 5(a) and 5(b), in accordance with an embodiment of the present invention, the ring-shaped spring 515 is shown in FIG. 5(a) in a free state before being fitted onto the spacer 501; and, the ring-shaped spring 515 is shown in FIG. 5(b) in a constrained state after being fitted in the spacer 501. The ring-shaped spring 515 is cut at one location; and, the ring-shaped spring 515 is provided with a slit 516. The ring-shaped spring 515 possesses a spring characteristic in a radial direction. The diameter of the ring-shaped spring 515 fitted in the spacer depicted in FIG. 5(b) is smaller than the diameter in the free state depicted in FIG. 5(a). Accordingly, the ring-shaped spring 515 on the spacer 501 generates an outward spring force and presses against the upper ring 512 and the lower ring 513. Since the ring-shaped spring 515 provides outward spring force in the spacer 501, the ring-shaped spring 515 is prevented from slipping off the spacer 501 in manufacturing and operation of the HDD 1, and electrical conductivity between the upper ring 512 and the lower ring 513 is maintained.

With further reference to FIG. 4(b), in accordance with an embodiment of the present invention, the cross sections of the upper ring 512 and the lower ring 513 are a rectangle with tapered corners. The upper ring 512 includes tapered surfaces 521a and 521b in the ID surface and tapered surfaces 521c and 521d in the OD surface. Similarly, the lower ring 513 includes tapered surfaces 531a and 531b in the ID surface and tapered surfaces 531c and 531d in the OD surface. The ring-shaped spring 515 is present between the ID lower tapered surface 521b of the upper ring 512 and the ID upper tapered surface 531a of the lower ring 513 and is in contact with the ID lower tapered surface 521b of the upper ring 512 and the ID upper tapered surface 531a of the lower ring 513. The ring-shaped spring 515 is not bonded to the tapered surfaces 521b and 531a with adhesive. The ring-shaped spring 515 may slide on the tapered surfaces 521b and 531a and vary diameter. The ring-shaped spring 515 needs to contact both the tapered surfaces 521b and 531a. If the spacer 501 deforms in manufacturing and usage of the HDD 1, the ring-shaped spring 515 slides on the tapered surfaces 521b and 531a to change diameter so that the ring-shaped spring 515 is always in contact with the upper ring 512 and the lower ring 513 without interfering with the damping performance of the damping sheet 514.

Figure 6:
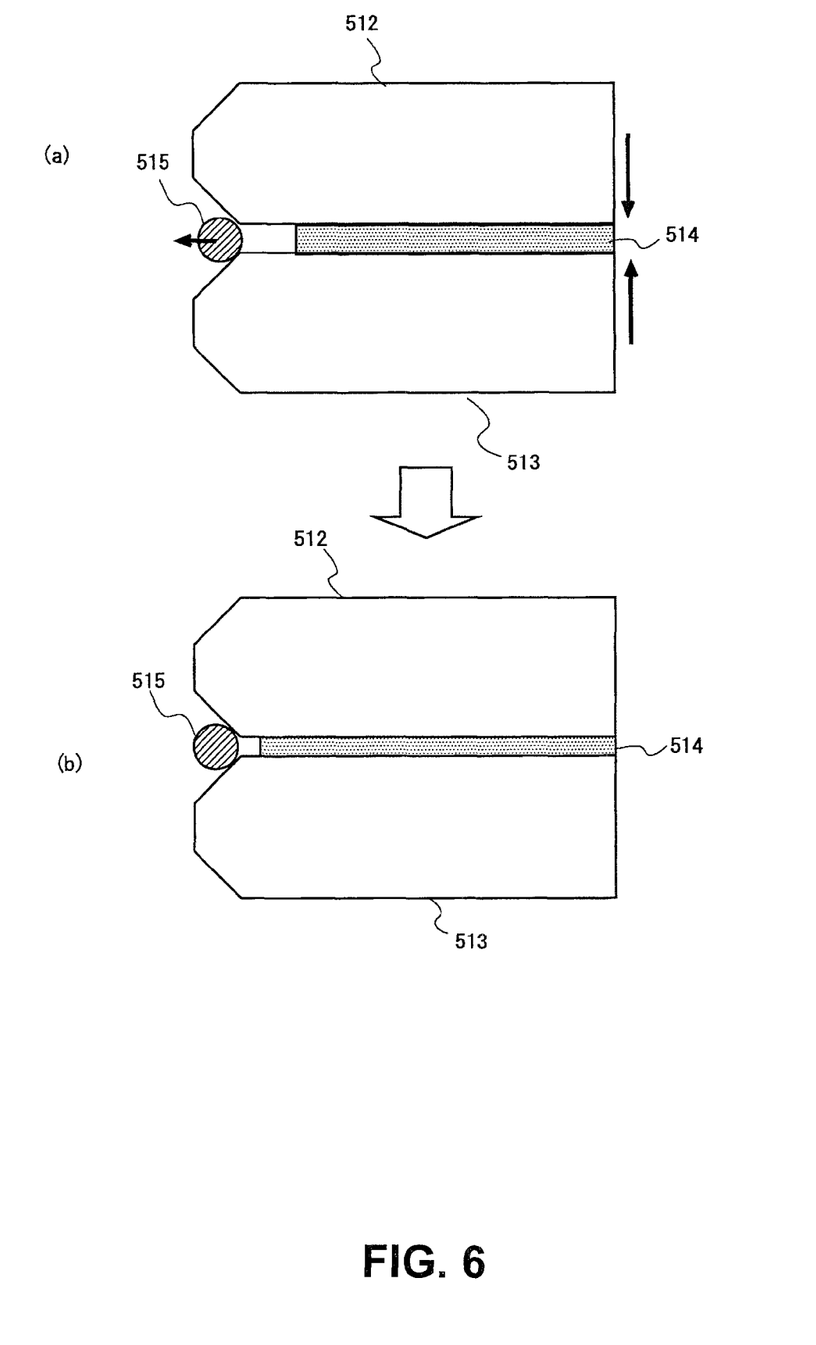
FIG. 6(a) is a cross-sectional elevation view through the spacer of FIG. 4(a) that illustrates the deformation of the spacer of FIG. 4(a), and the accompanying movement of the ring-shaped spring of FIG. 5(a) when securing the spacer to a hub with a clamp, in accordance with an embodiment of the present invention.
FIG. 6(b) is a cross-sectional elevation view through the spacer of FIG. 4(a) and the ring-shaped spring of FIG. 5(a) that further illustrates the accompanying movement and deformation of the ring-shaped spring of FIG. 5(a) when securing the spacer to a hub with a clamp, in accordance with an embodiment of the present invention.

With reference now to FIGS. 6(a) and 6(b), in accordance with an embodiment of the present invention, the deformation of the spacer 501 and the accompanying movement, or deformation, of the ring-shaped spring 515 when securing the spacer 501 and the magnetic-recording disks 101 to the hub 301 with the clamp 108 in manufacturing the HDD 1 is shown. FIG. 6(a) illustrates the spacer 501 before being sandwiched between the magnetic-recording disks 101. FIG. 6(b) illustrates the spacer 501 secured between the magnetic-recording disks by the hub 301 and the clamp 108. As understood from FIGS. 6(a) and 6(b), if the spacer 501 is pressed by upper and lower magnetic-recording disks, the thickness of the center damping sheet 514 in the spacer 501 is reduced; as a result, the distance between the upper ring 512 and the lower ring 513 is reduced. As the distance between the tapered surface 521b and the tapered surface 531a decreases, the ring-shaped spring 515 slides on the tapered surfaces 521b and 531a and the ring-shaped spring 515 contracts inward to reduce diameter. Accordingly, contact between the ring-shaped spring 515 and the tapered surfaces 521b and 531a is maintained.

With further reference to FIGS. 6(a) and 6(b), in accordance with an embodiment of the present invention, the upper ring 512 and the lower ring 513 provide a portion of the spacer 501 that expands and contracts with temperature variation. In addition, the disks, the damping sheet and the clamp also expand with heat and change position. As a result, the compressive force between the disks varies and the spacing between the tapered surface 521b and the tapered surface 531 varies. The ring-shaped spring 515 slides on the tapered surfaces 521b and 531a responsive to these variations to maintain contact with the tapered surfaces 521b and 531a. Thus, the electrical conductivity of the spacer 501 is maintained independent of the usage environment of the HDD 1. In contrast with embodiments of the present invention, if the ring-shaped spring 515 were not configured to slide on the tapered surfaces 521b and 531a, the ring-shaped spring 515 might dig into the tapered surfaces 521b and 531a, resulting in generation of metal particles, unexpected deformation of the upper ring 512 and the lower ring 513, and contact failure between the ring-shaped spring 515 and the tapered surfaces 521b and 531a caused by expansion and contraction of the upper and lower rings 512 and 513 due to temperature variation.

With further reference to FIGS. 6(a) and 6(b), in accordance with an embodiment of the present invention, the ring-shaped spring 515 is fitted in a groove provided by the tapered surface 521b of the upper ring 512 and the tapered surface 531a of the lower ring 513. In one embodiment of the present invention, the ring-shaped spring 515 always maintains contact with the tapered surfaces 521b and 531a. To this end, in an embodiment of the present invention, the ring-shaped spring 515 that is placed on the tapered surfaces 521b and 531a is capable of sliding on the tapered surfaces 521b and 531a by the action of the spring force, which allows an outward expansion of the ring-shaped spring 515. Thus, the ring-shaped spring 515 reaches the deepest position in the groove and maintains contact with the tapered surfaces 521b and 531a. More precisely, when damping sheet is secured with the clamp, the damping sheet contracts in the upper-lower direction; as a result, the ring-shaped spring is compressed by a force directed toward the disk center. Therefore, the spring force and the taper angles are designed so that the ring-shaped spring is in contact with the tapered surfaces 521b and 531a under both the action of the spring force and the force directed toward the disk center generated in securing the clamp. With respect to forces acting, the force caused by the damping sheet depends on the range of thickness of the damping sheet and is smaller than the spring force. Assuming the taper angle is $\theta$, the taper angle is sufficient if the spring force is so strong that the ring-shaped spring slides on the tapered surfaces 521b and 531a to expand outward. The sliding characteristic of the ring-shaped spring 515 depends on the spring force of the ring-shaped spring 515, the taper angles of the tapered surfaces 521b and 531a and the friction coefficients of the tapered surfaces 521b and 531a.

Figure 7:
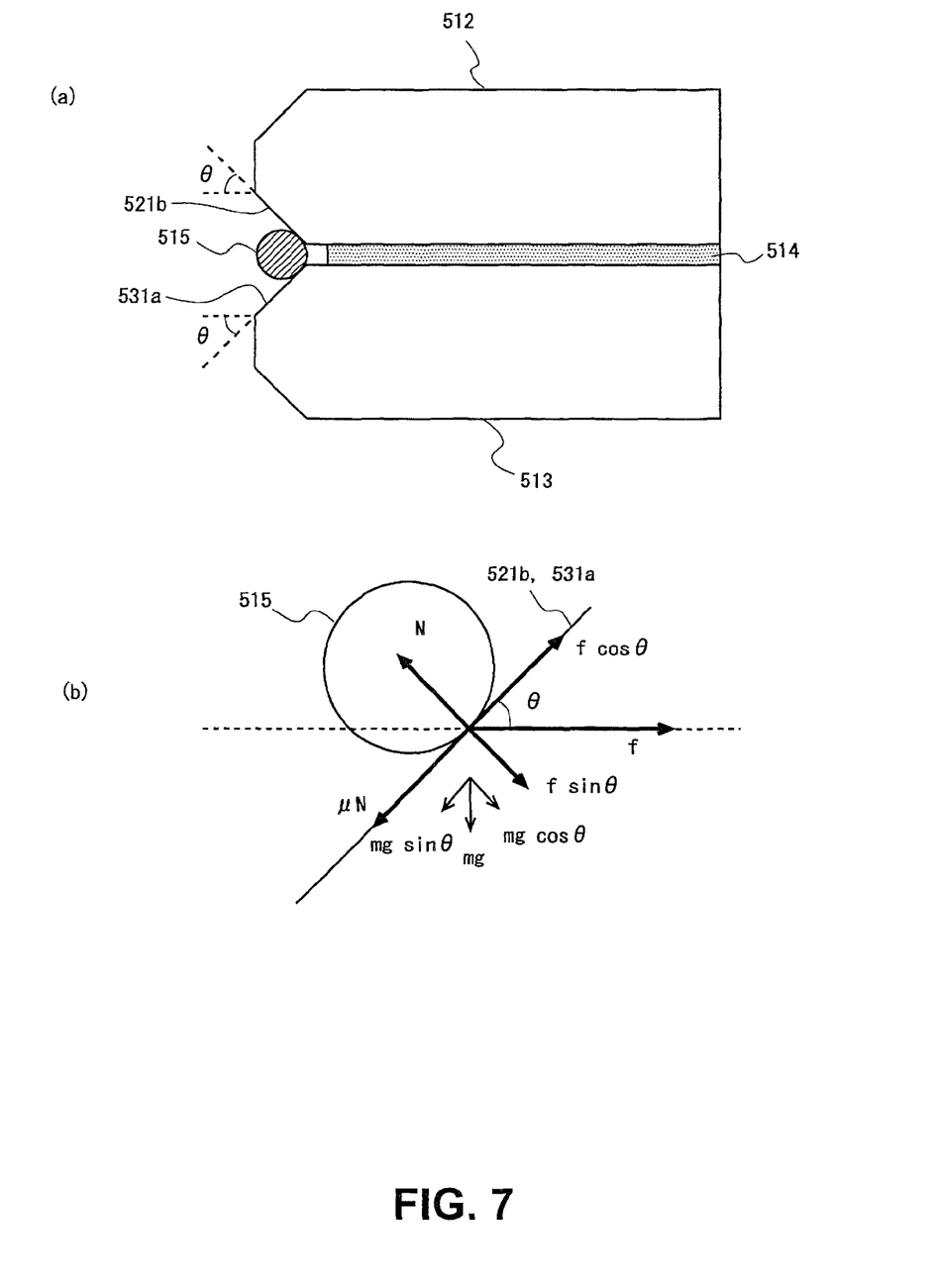
FIG. 7(a) is a cross-sectional elevation view through the spacer of FIG. 4(a) and the ring-shaped spring of FIG. 5(a) that illustrates a relation between taper angles and friction forces of upper and lower rings, in accordance with an embodiment of the present invention.
FIG. 7(b) is a cross-sectional elevation view through the ring-shaped spring of FIG. 5(a) that further illustrates the relation between taper angles and friction forces of upper and lower rings, in accordance with an embodiment of the present invention.

With reference now to FIGS. 7(a) and 7(b), in accordance with an embodiment of the present invention, the relation among parameters affecting the ring-shaped spring 515 is shown. In FIGS. 7(a) and 7(b), each of the taper angles of the tapered surfaces 521b and 531a is $\theta$; the spring force of the ring-shaped spring 515 to each of the tapered surfaces 521b and 531a is f; and, each of the friction coefficients of the tapered surfaces 521b and 531a is $\mu$. The taper angle $\theta$ is the angle between the opposing horizontal planes of the upper and lower rings 512 and 513 and the tapered surfaces 521b and 531a, respectively. N is a counter force against a component of the spring force vertical to each of the tapered surfaces 521b and 531a. In the example illustrated in FIGS. 7(a) and 7(b), the material, surface condition and shape of the tapered surfaces 521b and 531a are the same and each of the above-mentioned parameters for respective tapered surfaces 521b and 531a are equal to one another for respective tapered surfaces 521b and 531a.

With further reference to FIGS. 7(a) and 7(b), in accordance with an embodiment of the present invention, in order for the ring-shaped spring 515 to slide and expand on the tapered surfaces 521b and 531a in response to the spring force, the spring force of the ring-shaped spring 515 must be greater than the friction forces on the tapered surfaces 521b and 531a. Each of the spring forces along the tapered surfaces 521b and 531a is f cos $\theta$. The friction force is $\mu$N and the gravity is mg. The relations among the forces are expressed as follows:

$$f \cos \theta = mg \sin \theta + \mu N \quad \text{(Equation 1)}$$

$$N = f \sin \theta + mg \cos \theta \quad \text{(Equation 2)}$$

Assuming the gravity force of the ring-shaped spring is small compared to the spring force, the following relation is obtained from equation 1 and equation 2.

$$\theta = \arctan(1/\mu) \quad \text{(Equation 3)}$$

With further reference to FIGS. 7(a) and 7(b), in accordance with an embodiment of the present invention, assuming the spring force is f and the taper angle and is $\theta_0$, if the taper angle $\theta_1 < \theta_0$, the ring-shaped spring moves outward on the tapered surface 521b and the tapered surface 531a. Under the condition that the friction coefficient $\mu$ is constant and the spring force does not change, if the taper angle is greater than the static friction angle $\theta_0$, the friction force overcomes the spring force and a large counter force is applied inward on the tapered surface; as a result, the ring-shaped spring does not move outward. For example, assuming that the friction coefficient is about equal to the friction coefficient between iron surfaces, $\mu$ is 0.5, the static friction angle $\theta_0$ is approximately 63° and the taper angle $\theta$ is smaller than 63°.

With further reference to FIGS. 5(a) and 5(b), in accordance with an embodiment of the present invention, the ring-shaped spring 515 is provided with a slit 516 and the slit width reduces with diameter. In an embodiment of the present invention, the ring-shaped spring 515 is provided with the slit 516 even after being fitted onto the spacer 501 and assembled within the HDD 1. Thus, the ring-shaped spring 515 may effectively change diameter according to the expansion and contraction of other parts caused by temperature variation. In accordance with embodiments of the present invention, in consequence of the provision of a slit 516, the ring-shaped spring 515 may change diameter smoothly in manufacturing and operation of the HDD 1. In one embodiment of the present invention, the ring-shaped spring 515 is circular in cross section. If a cross section were to have corners, the corners might interfere with the sliding of the ring-shaped spring 515 on the tapered surfaces 521b and 531a by increasing the friction force, or alternatively, by digging into the tapered surfaces 521b and 531a of the ring-shaped spring 515. The ring-shaped spring 515 that is circular in cross section may slide on the tapered surfaces 521b and 531a with a constant friction force; and, moreover, the ring-shaped spring 515 that is circular in cross section is easy to produce in manufacturing.

With further reference to FIGS. 7(a) and 7(b), in accordance with an embodiment of the present invention, the tapered surfaces 521b and 531a that the ring-shaped spring 515 contacts are flat. For example, the tapered surfaces 521b and 531a may be a curved surface. However, a flat surface allows easy control and design of the sliding characteristic of the ring-shaped spring 515 and easy design of the spacer 501 including the ring-shaped spring 515 with a variable diameter. In an embodiment of the present invention, the tapered surfaces 521b and 531a are not rough, but smooth, for the ring-shaped spring 515 to slide smoothly.

With further reference to FIGS. 7(a) and 7(b), in accordance with an embodiment of the present invention, the taper angles θ of the tapered surfaces 521b and 531a are equal. In an embodiment of the present invention, although a spacer may have different taper angles, the types of parts and difficulty in the design of such parts for spacers having different taper angles increases. Equal taper angles permits easy control and design of the sliding characteristic of the ring-shaped spring 515 and easy design of the spacer 501 including a ring-shaped spring 515 with variable diameter. The thicknesses, ODs and IDs, as well as the distance between the ID surface and the center, of the upper and lower rings 512 and 513 may be different in relation to the ring-shaped spring 515. However, in an embodiment of the present invention, to provide simple structure and design, the thicknesses of the upper and lower rings 512 and 513 are equal; and, the ODs and IDs, as well as the distance between the ID surface and the center, of the upper and lower rings 512 and 513 are equal.

With further reference to FIG. 4(b), in accordance with an alternative embodiment of the present invention, although, in the above description, the ring-shaped spring 515 is placed on the ID surface of the spacer 501, associated with the upper ring 512 and the lower ring 513, the ring-shaped spring 515 may be placed on the OD surface of the spacer 501, associated with the upper ring 512 and the lower ring 513. As illustrated in FIG. 4(b), the upper and lower rings 512 and 513 have tapered surfaces in the OD surfaces. In an embodiment of the present invention, the ring-shaped spring 515 may be fitted to contact the lower tapered surface 521d of the upper ring 512 and the upper tapered surface 531c of the lower ring 513 to provide electrical conductivity between the upper ring 512 and the lower ring 513. If the ring-shaped spring 515 is fitted onto the OD surface of the spacer 501, the ring-shaped spring 515 is designed to securely hold the spacer 501 by the action of the spring force. The ring-shaped spring 515 has a smaller diameter in a free state before being fitted onto the spacer 510 and a larger diameter after being fitted onto the spacer 510. The fitted ring-shaped spring 515 generates an inward spring force and presses the upper ring 512 and the lower ring 513 inwards towards the spindle axis. For the ring-shaped spring on the OD surface, a similar description to that previously discussed for the ring-shaped spring on the ID surface described referring to FIG. 7 applies to conditions for sliding on the tapered surface, for example, variability of diameter of the ring-shaped spring 515. The ring-shaped spring configured to be fitted onto the OD surface has two cut ends that cross with one another in a free state. In manufacturing, the spacer 501 expands the ring-shaped spring; and, the ring-shaped spring is fit onto the OD surface of the spacer 501. The ring-shaped spring mounted on the spacer 501 is provided with a small slit so that the cut ends are slightly separated. Accordingly, the ring-shaped spring holds the spacer 501 by pressing the OD surface; and, moreover, the ring-shaped spring may change diameter on the spacer 501.

In accordance with an alternative embodiment of the present invention, the ring-shaped springs may be placed on either the ID surface, or the OD surface, or both the ID surface and the OD surface. A ring-shaped spring on one side surface is enough to electrically connect the upper and lower rings 512 and 513. In this case, in an embodiment of the present invention, the ring-shaped spring 515 is disposed on the ID surface of the spacer 501. Centrifugal force is applied to the ring-shaped spring 515 rotated by the SPM 103. If the ring-shaped spring 515 is on the OD surface, the direction of the spring force of the ring-shaped spring 515 is opposite to the direction of centrifugal force. Centrifugal force reduces the pressing force of the ring-shaped spring 515 on the OD surface of the spacer 501; as a result, the ring-shaped spring 515 may come off the spacer 501. The spring force of the ring-shaped spring 515 on the ID surface points outward as does the centrifugal force. Since the ring-shaped spring 515 is supported by the ID surface in contact with it, there is no possibility that the ring-shaped spring 515 can come lose.

In accordance with embodiments of the present invention, if the ring-shaped spring 515 is on the OD surface, metal particles caused by the ring-shaped spring 515 spread over the magnetic-recording disks. On the other hand, the ring-shaped spring 515 on the ID surface, as illustrated in FIG. 2, is placed in a closed space defined by the magnetic-recording disks 101, the spacers 501, the hub 301 and the clamp 108. Thus, even if metal particles are generated, the metal particles are prevented from spreading over the magnetic-recording disks 101 within the DE.

As understood from the above description, in an embodiment of the present invention, a ring-shaped spring that is cut at one location and straight in the circumferential direction electrically connects the upper ring 502 and the lower ring 503. However, other different ring-shaped springs may be used for the spacer 501. For example, a closed ring-shaped spring with wave shape in the circumferential direction may be used. Such a ring-shaped spring has a variable diameter.

Embodiments of the present invention, as set forth above, are by way of example without limitation thereto. A person skilled in the art may easily modify, add, and convert each element in an embodiment of the present invention within the spirit and scope of embodiments of the present invention. For example, embodiments of the present invention, as set forth above, are especially effective in HDDs; however, embodiments of the present invention, as set forth above, may be applied to other types of disk drives. For example, in one embodiment of the present invention, a spacer may be interposed between a magnetic-recording disk and a clamp, or between a magnetic-recording disk and a supporter of a hub, instead of, or in addition to, between the magnetic-recording disks. In another embodiment of the present invention, a spacer may be configured to have: a ring; a damping sheet configured to be interposed between a disk and the ring; and, a ring-shaped spring in contact with the disk and the ring.

Figure 8:
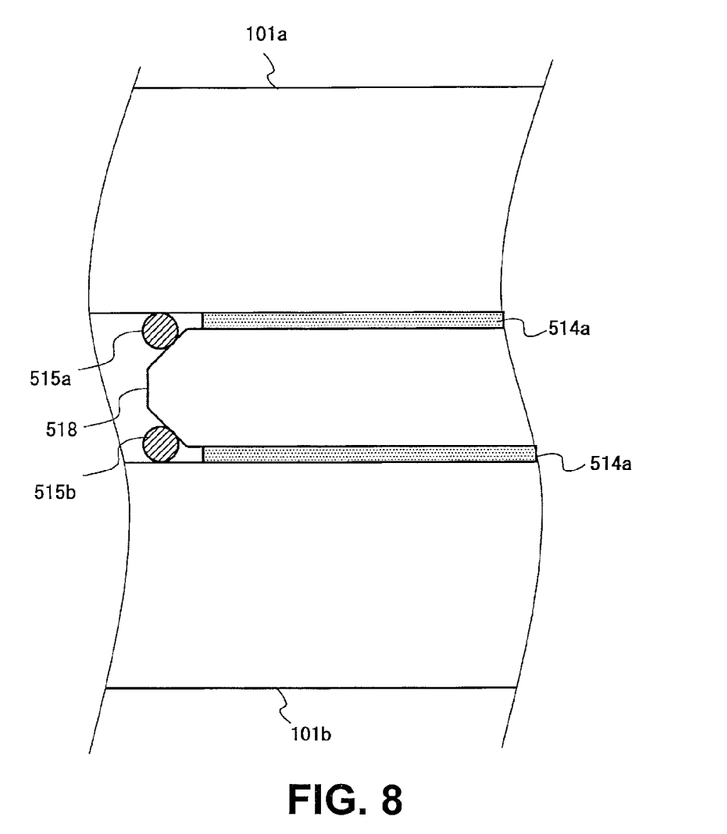
FIG. 8 is a cross-sectional elevation view that illustrates an example conductive ring, damping sheets interposed between the conductive ring and magnetic-recording disks, and two ring-shaped springs contacting the conductive ring and the magnetic-recording disks, in accordance with an embodiment of the present invention.

For example, with reference now to FIG. 8, in accordance with an embodiment of the present invention, one conductive O-ring 518 is secured between the two magnetic-recording disks 101a and 101b and damping sheets 514a and 514b are interposed between the metal ring 518 and the upper and the lower magnetic-recording disks 101a and 101b, respectively. The ring-shaped spring 515a of the two ring-shaped springs 515a and 515b contact the upper magnetic-recording disk 101a and the metal ring 518, and the other ring-shaped spring 515b contacts the lower magnetic-recording disk 101b and the metal ring 518.

Furthermore, in accordance with embodiments of the present invention, in order to ground all magnetic-recording disks, some of the spacers may be non-conductive. In accordance with embodiments of the present invention, magnetic-recording disks may be grounded with a magnetic-recording disk, or alternatively, with a hub. Accordingly, one spacer between middle magnetic-recording disks, of which the spacer 501c in FIG. 2 is an example, may be electrically insulating. In another embodiment of the present invention, a spacer may include a single damping sheet to reduce the number of parts. Alternatively, in another embodiment of the present invention, a spacer with three, or more, rings and two, or more, damping sheets may be mounted within the HDD 1.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A disk drive comprising:
   a motor;
   a hub coupled to a spindle shaft of said motor;
   at least two disks each having a center hole and being coupled to said hub; and
   a spacer having a center hole, said spacer disposed around said hub such that said hub is disposed within said center hole of said spacer, said spacer sandwiched between and in contact with said two disks to define a spacing between said two disks, and said spacer comprising:
      at least two conductive rings each having a center hole, said two conductive rings disposed around said hub such that said hub is disposed within said center hole of said two conductive rings, said two conductive rings secured between said two disks;
      a damping sheet configured to absorb vibration between said two conductive rings; and
      a conductive ring-shaped spring having a spring characteristic in a radial direction of said disks to make a diameter variable, said conductive ring-shaped spring in contact with both of said two conductive rings.

2. The disk drive of claim 1, wherein said ring-shaped spring is cut at one location and is straight in said circumferential direction.

3. The disk drive of claim 2, wherein said ends of said ring-shaped spring are separated when said ring-shaped spring is mounted.

4. The disk drive of claim 2, wherein said ring-shaped spring is in contact with an inside-diameter surface of said ring while pressing said inside-diameter surface of said ring.

5. The disk drive of claim 1, wherein said two conductive rings comprise an upper ring and a lower ring; and said ring-shaped spring is in contact with inside-diameter surfaces of said upper ring and said lower ring while pressing said inside-diameter surfaces of said upper ring and said lower ring.

6. The disk drive of claim 1, wherein said two conductive rings comprise an upper ring and a lower ring; a side surface of said upper ring has a tapered surface on a lower side; a side surface of said lower ring has a tapered surface on an upper side; and said ring-shaped spring is in contact with both of said tapered surface of said upper ring and said tapered surface of said lower ring.

7. The disk drive of claim 6, wherein a cross-section of said ring-shaped spring is circular.

8. The disk drive of claim 6, wherein taper angles of said tapered surface of said upper ring and said tapered surface of said lower ring are equal.

9. The disk drive of claim 6, wherein said tapered surface of said upper ring and said tapered surface of said lower ring each satisfy a following relationship with said ring-shaped spring:

$$\theta < \arctan(\mu)$$

where $\theta$ is a taper angle and $\mu$ is a friction coefficient between said ring-shaped spring and said tapered surface.

10. The disk drive of claim 1, further comprising:
   a clamp for securing a plurality of disks comprising said at least two disks with a supporter of said hub to sandwich said disks; and
   a second spacer having a same structure as said spacer between said clamp and said disk, and between said supporter and said disk.

11. A disk drive comprising:
   a motor;
   a hub coupled to a spindle shaft of said motor;
   a disk having a center hole and being coupled to said hub;
   a clamp for securing said disk to said hub; and
   a spacer having a center hole, said spacer disposed around said hub such that said hub is within said center hole of said spacer, said spacer sandwiched between and in contact with said disk and said clamp to define a spacing between said disk and said clamp, and said spacer comprising:
      a conductive ring having a center hole, said conductive ring disposed around said hub such that said hub is disposed within said center hole of said conductive ring, said conductive ring secured between said clamp and said disk;
      a damping sheet configured to absorb vibration between said conductive ring and said disk; and
      a conductive ring-shaped spring having a spring characteristic in a radial direction of said disk to make a diameter variable, said conductive ring-shaped spring in contact with both said conductive ring and said disk that sandwich said damping sheet.

12. The disk drive of claim 11, wherein said ring-shaped spring is cut at one location and is straight in a circumferential direction; and ends of said ring-shaped spring are separated when said ring-shaped spring is mounted.

13. A spacer that is configured to be interposed between disks of a disk drive to define a spacing between said disks, said spacer comprising:
   an upper ring having a center hole and being an electrical conductor;
   a lower ring having a center hole and being an electrical conductor;
   a damping sheet provided between said upper ring and said lower ring and configured to absorb vibration of said upper ring and said lower ring; and
   a ring-shaped conductive spring having a spring characteristic in a radial direction of said upper ring and said lower ring to make a diameter variable and being in contact with both side surfaces of said upper ring and said lower ring while pressing said side surfaces of said upper ring and said lower ring.

14. The spacer of claim 13, wherein said ring-shaped spring is cut at one location and is straight in a circumferential direction.

15. The spacer of claim 14, wherein ends of said ring-shaped spring are separated between said upper ring and said lower ring.

16. The spacer of claim 13, wherein said ring-shaped spring is in contact with an inside-diameter surface of said upper ring and said lower ring while pressing both of said inside-diameter surfaces of said upper ring and said lower ring.

17. The spacer of claim 13, wherein said side surface of said upper ring has a tapered surface on a lower side; said side surface of said lower ring has a tapered surface on an upper side; and said ring-shaped spring is in contact with both said tapered surface of said upper ring and said tapered surface of said lower ring.

18. The spacer of claim 17, wherein a cross-section of said ring-shaped spring is circular.

19. The spacer of claim 17, wherein taper angles of said tapered surface of said upper ring and said tapered surface of said lower ring are equal.

20. The spacer of claim 17, wherein said tapered surface of said upper ring and said tapered surface of said lower ring each satisfy a following relationship with said ring-shaped spring:

$$\theta < \arctan(\mu)$$

where $\theta$ is a taper angle and $\mu$ is a friction coefficient between said ring-shaped spring and said tapered surface.

* * * * *